March 29, 1960     E. HUTZENLAUB     2,930,607
AIR SPRING UNIT
Filed April 17, 1957                             2 Sheets-Sheet 1
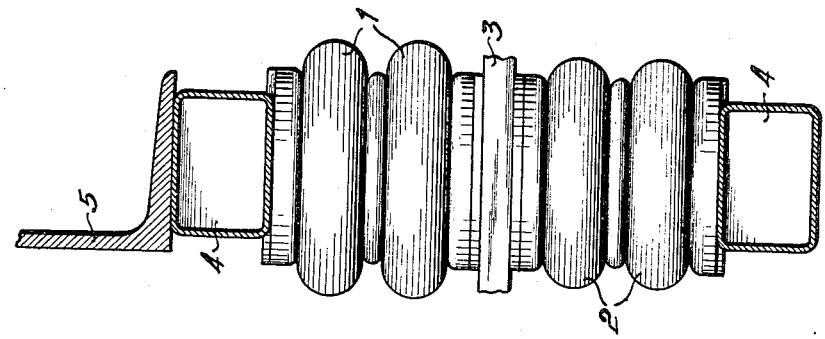
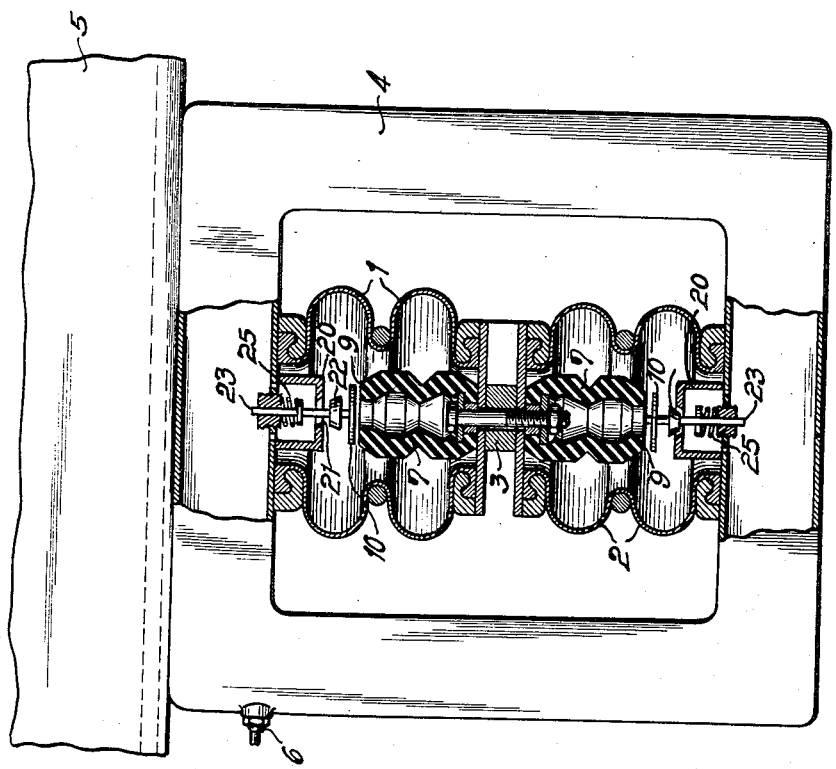
INVENTOR
Ernst Hutzenlaub
By
Patent Agent.

March 29, 1960
E. HUTZENLAUB
2,930,607
AIR SPRING UNIT
Filed April 17, 1957
2 Sheets-Sheet 2
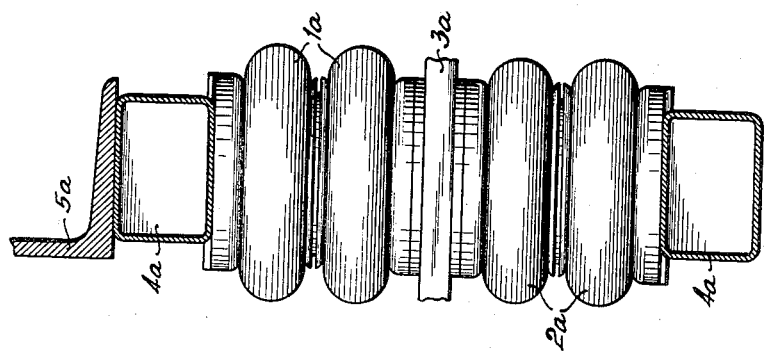
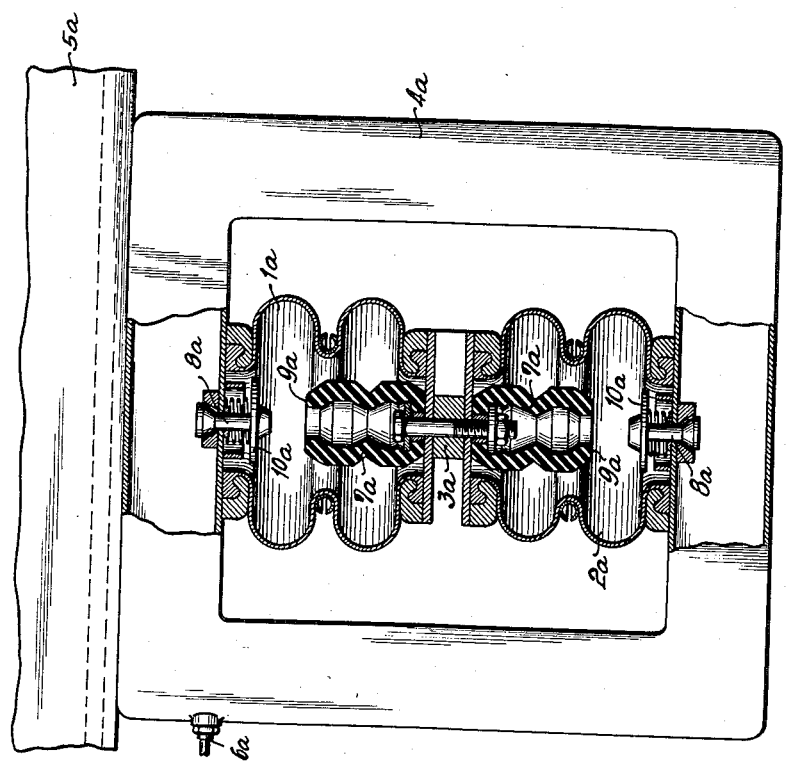
INVENTOR
Ernst Hutzenlaub
By
Patent Agent

United States Patent Office 2,930,607
Patented Mar. 29, 1960

2,930,607

AIR SPRING UNIT

Ernst Hutzenlaub, Gehrden, near Hannover, Germany, assignor to Wilhelm Herm. Muller & Co., Kommanditgesellschaft, Hannover, Germany Application April 17, 1957, Serial No. 653,424

Claims priority, application Germany April 19, 1956

5 Claims. (Cl. 267—35)

The present invention relates to an air spring unit for vehicles, especially motor and rail vehicles, in which a plurality of bellows filled with air under compression and yieldable primarily in vertical direction are arranged in such a manner that when one bellows is under load, another bellows associated therewith is either entirely or partly relieved, while a portion of the air can flow from the bellows under load through an auxiliary container into the relieved bellows.

Air spring units are known according to which air spring bellows are arranged above the wheels of a vehicle. With these known constructions, the bellows are either directly connected with each other or with stationary auxiliary containers which latter through valves and feeding conduits communicate with stationary containers for compressed air. These constructions yield a hard spring action with high pressures, while with the constructions with direct feeding of the bellows, a considerable wear of the bellows is encountered in addition to the fact that this type of spring unit is easily liable to disorders. With all of these heretofore known air spring units, the considerable requirement of compressed air is an important disadvantage. These known constructions also make it mandatory to store large quantities of compressed air at high pressure so that valuable installation space for the storage containers is required which is lost for the transport capacity of the respective vehicle. In addition to the above, the air spring units of the above mentioned type require a considerable compressor which continuously has to replace the air losses caused by the venting of the air whenever the maximum spring stroke is obtained so that continuously the portion of the power output intended for the locomotion of the vehicle is consumed by the compressor.

It is, therefore, an object of the present invention to provide an improved air spring unit which will overcome the above mentioned drawbacks.

It is also an object of this invention to provide an improved air spring unit especially for vehicles, which will be highly efficient without the necessity that with each maximum spring stroke compressed air has to be vented or fed into the unit.

A still further object of the invention consists in the provision of an air spring unit which will be characterized by an extreme low consumption of compressed air.

It is also an object of this invention to provide an improved spring unit of the above mentioned type which while avoiding a hard spring action will also dampen the rebound.

These and other objects and advantages of the invention will appear more clearly from the following specification in connection with the accompanying drawings in which:

Fig. 1 illustrates partly in section a spring unit according to the present invention.

Fig. 2 is a side view of Fig. 1 showing the frame in which the bellows are mounted in section.

Fig. 3 illustrates similar to Fig. 1 a spring unit somewhat modified over that of Fig. 1.

Fig. 4 shows the spring unit of Fig. 3 in view while showing the frame for said spring unit in section.

*General arrangement*

The air spring unit according to the present invention is characterized primarily in that two air spring bellows are arranged in a closed frame which serve simultaneously as auxiliary air container while the structural member supporting the wheels is arranged intermediate said two air spring bellows. The frame is firmly connected to the chassis so that the vehicle axle can oscillate between the two air spring bellows, while the spring softness is determined by the ratio of the volume of said two air spring bellows with regard to each other. The oscillation strokes of the axle upwardly and downwardly in the direction of the air spring bellows is limited by the volumetric efficiency of said bellows as well as by separate hollow rubber springs having a line of characteristic with a flat starting portion so that the characteristics of the air spring unit will only be slightly modified by the spring characteristics of the hollow rubber springs. It is a well known fact that the course of the line of characteristics of air spring bellows is extremely flat and only slightly progressively ascending, which means that only a relatively small change in load is required in order to produce a relatively large spring deflection.

Communication between the air spring bellows and the auxiliary air container is established by means of independently operable valves which, normally open, by contact with closely positioned hollow spring members, are closed toward the end of each oscillation stroke. According to a further development of the invention, with completely compressed hollow rubber springs or when the latter has hit an abutment, a feeding valve is opened as a result of which additional compressed air is fed from an auxiliary container or is vented from the latter or the air spring bellows.

A unit according to the present invention as set forth above, makes it possible that the vehicle axle together with the auxiliary container can resiliently oscillate to a great extent without the necessity of supplying compressed air or venting the same, as will presently appear.

*Structural arrangement*

Referring now to the drawing in detail and Figs. 1 and 2 thereof in particular, it will be seen from Fig. 1 that the vehicle axle 3 is arranged between the spring bellows 1 and 2. The spring bellows 1 and 2 are clamped in in a closed frame 4 having a tubular or box-shaped profile and simultaneously serving as auxiliary air container for the air spring bellows. This frame 4 is rigidly connected to the chassis 5. The frame 4 has a connection 6 which leads to the auxiliary air container or to the valve for the change of the volumetric efficiency of the frame-like auxiliary container.

The ratio of the magnitude of the two bellows with regard to each other determines the softness of the spring unit. If the bellows 1 and the bellows 2 have the same volume and the same height, it will be evident that, if the bellows were filled to the same extent, the equilibrium between the two bellows will be established when the axle 3 occupies its intermediate position as shown in Fig. 1. With additional load acting upon the chassis, the bellows 1 will be compressed further, whereas the bellows 2 will be pulled apart to the same extent and will thereby be relieved. In this instance a varying force will act counter to the load conveyed through the chassis unto the bellows 1 whereby a very soft springiness will be obtained without the necessity of dimensioning the individual bellows excessively large, while a relatively small air container will suffice. If the bellows 2 were made smaller than the bellows 1, the spring characteristics will become harder. Preferably, therefore, the bellows 1 is selected bigger than the bellows 2.

With increasing load acting upon the chassis, and thereby with increasing compression of one of the bellows, a rubber spring 7 will contact a valve generally designated 8 which will be closed by the rubber spring. Each of the two valves 8 shown in Fig. 1 comprises a housing 20 with a valve seat 21 which is adapted to be closed by a valve head 22 carried by a valve stem 23 which latter has connected thereto a valve disc 10. Arranged within the housing 20 is a spring 25 which continuously acts upon the valve head 22 so as to urge the same away from the valve seat. The housing 20 is connected to frame member 4. The valves 8 are the only means for establishing and interrupting communication between the respective bellows and the auxiliary container formed by the frame member 4. Due to the fact that the rubber spring 7 is so designed that it has a relatively long spring stroke and a softly starting spring characteristic, the increase in pressure in bellows 1 following the closure of the valve 8 is effected only gradually without materially modifying the total characteristics of the desired springiness. The selection of the distance between the upper abutment surface 9 of the hollow rubber spring and the valve disc 10 of the valve likewise influences the course of the line of spring characteristics. As a result of this arrangement it is assured that air will not be used or vented with each shock or each larger deflection of the vehicle. Due to the characteristics of the rubber spring in combination with the resiliency of the air in the bellows, the springiness even with sudden shocks is still such that hard abutments and sudden increases in the pressure will be avoided.

In a reverse manner, with the rebound, the bellows 2 is compressed and with further rebound, the outer or abutment surface 9 of the lower hollow rubber spring 7 contacts the valve disc 10 of the valve 8 so as to close the latter. As a result thereof, the air in the spring bellows 2 is compressed while at the same time the lower hollow rubber spring 7 is compressed until the system comes to a standstill. In this instance the spring bellows 1 will expand.

The two valves 8 at the upper and lower ends of the spring unit for establishing communication of the interior of the spring bellows 1 and 2 with the interior of the frame-shaped auxiliary container 4 are with the embodiment shown in Fig. 1 normally in open condition and are closed by the actuation of the hollow rubber springs.

Referring now to the embodiment shown in Figs. 3 and 4, those parts thereof which correspond to the parts of Figs. 1 and 2 are designated with the same reference numerals as in Figs. 1 and 2 but with the additional character "a." According to the embodiment of Figs. 3 and 4, the valves 8a are so designed that they are normally closed and that initially only the air volume in the individual bellows is employed to furnish the desired spring action. When a further compression of one of the bellows occurs, the disc 10a of the respective valve is actuated so as to establish communication between the respective bellows and the auxiliary container 4a, thereby adding a further air volume to the air volume which up to that point at which the valve was opened had alone furnished the respective springiness. Thus, the springiness will now become softer, but at the same time will progressively decrease in view of the characteristics of the rubber spring 7a. This modification illustrated in Fig. 3 furnishes spring characteristics with steps, the medium working range of which, has desired soft spring characteristics. This structure likewise has the advantages of imposing relatively low demand on the air supply system, and of making possible the use of air bellows of comparatively small cross section.

From the above, it will be evident that a portion of the spring action is furnished by the hollow rubber springs the characteristics of which are added to the extremely flat characteristics of the present air spring system in such a manner that a spring characteristic is obtained having a substantially uniform frequency over a wide working range without the necessity that at relatively minor changes in the spring stroke compressed air has to be fed from the supply units or that air has to be vented from the bellows.

Due to the combined characteristics of the air spring with the characteristics of the hollow rubber springs, with increasing spring stroke of the axle of the vehicle, a stronger progressiveness occurs which brings about a braking effect without the occurrence of an abutment and without the venting of air or additional feeding of air from the storage containers. In contrast to heretofore known air spring units, the arrangement according to the invention is characterized by a low consumption of compressed air. Additional structural elements such as hydraulic shock absorbers and buffers used for limiting the spring stroke are not necessary with the arrangement according to the invention. This is due to the fact that the arrangement of the air bellows in combination with the hollow rubber springs acting as control members for the establishment of communication between the respective bellows and the auxiliary air container, a hard springiness is avoided and at the same time the rebound is dampened. With air springs hitherto available in which the filling of the bellows is continuously controlled by means of control vaves, the actuating means for the valves, and particularly the guiding means for the stems thereof, are subjected to considerable stress during locomotion of the vehicles due to the continuous vibration, and undergo a considerable amount of wear. This disadvantage has been obviated by the air spring according to the present invention inasmuch as guiding means for the valve stems and connecting rods have been largely eliminated, actuation of the valves being effected in a gradual manner through essentially soft hollow rubber springs. It will be appreciated, that the operation of the spring system and the actuation of the valves is effected at a certain delay in view of the interposed hollow rubber springs.

It is, of course, understood that the present invention, is, by no means, limited to the particular constructions shown in the drawings but also comprises any modifications within the scope of the appended claims.

What I claim is:

1. In combination in a spring unit for vehicles having a chassis and a supporting member for supporting a wheel of said vehicle: a first bellows adapted to receive compressed air, a second bellows adapted to receive compressed air independently of said first bellows, said first and second bellows being substantially axially aligned with each other and having their inner ends mounted on and connected to opposite sides of said supporting member, a hollow frame member designed as an auxiliary air container common to said first and second bellows and connected to said chassis, said first and second bellows having their outer ends connected to said frame member, valve means respectively associated with said first and second bellows and operable independently of each other to selectively establish or interrupt communication between the respective bellows and said auxiliary container, means continuously urging said valve means into a certain position, and first and second yieldable resilient means respectively arranged within said first and second bellows only and having one end fixedly connected to said supporting member and having its other end normally adjacent to but spaced from the respective valve means pertaining to the respective bellows in which said resilient means is arranged, each of said resilient means being adapted in response to a certain position of the respective bellows pertaining thereto to actuate the respective adjacent valve means so as to vary the position thereof.

2. In combination in a spring unit for vehicles having a chassis and a supporting member for supporting a wheel of said vehicle: a first bellows adapted to receive compressed air, a second bellows adapted to receive compressed air, said first and second bellows being substantially axially aligned with each other and having their inner ends mounted on and connected to opposite sides of said supporting member, a hollow frame member designed as an auxiliary air container common to said first and second bellows and connected to said chassis, said first and second bellows having their outer ends connected to said frame member, valve means respectively associated with said first and second bellows and operable independently of each other to selectively establish or interrupt communication between the respective bellows and said auxiliary container, spring means continuously urging said valve means into open position to respectively establish communication between the respective bellows and said auxiliary container, and a plurality of rubber springs respectively arranged with said first and second bellows and normally spaced from the respective valve means pertaining to said first and second bellows, said rubber springs being substantially axially aligned and being adapted in response to a predetermined compression of the respective bellows to close the respective adjacent valve means.

3. In combination in a spring unit for vehicles having a chassis and a supporting member for supporting a wheel of said vehicle: a first bellows adapted to receive compressed air, a second bellows adapted to receive compressed air independently of said first bellows, said first and second bellows being substantially axially aligned with each other and having their inner ends mounted on and connected to opposite sides of said supporting member, a hollow frame member designed as an auxiliary air container common to said first and second bellows and connected to said chassis, said first and second bellows having their outer ends connected to said frame member, valve means respectively associated with said first and second bellows and operable independently of each other to selectively establish or interrupt communication between the respective bellows and said auxiliary container, spring means continuously urging said valve means into closed position to respectively interrupt communication between the respective bellows and said auxiliary container, and rubber springs respectively arranged within said first and second bellows and in substantially axial alignment with each other, each of said rubber springs having one end normally spaced from the respective valve means pertaining to said first and second bellows and having its other end fixedly connected to said supporting member, said rubber springs being adapted in response to a predetermined compression of the respective bellows to open the adjacent valve means.

4. In combination in a spring unit for vehicles having a chassis and a supporting member for supporting a wheel of said vehicle: a first bellows adapted to receive compressed air, a second bellows adapted to receive compressed air and having a smaller volume than said first bellows, said first and second bellows being substantially axially aligned with each other and having their inner ends mounted on and connected to opposite sides of said supporting member, a hollow frame member designed as an auxiliary air container common to said first and second bellows and connected to said chassis, said first and second bellows having their outer ends connected to said frame member, valve means respectively associated with said first and second bellows and operable independently of each other to selectively establish or interrupt communication between the respective bellows and said auxiliary container, means continuously urging said valve means into a certain position, and first and second resilient means respectively arranged within said first and second bellows and adapted in response to a certain position of the respective bellows pertaining thereto to actuate the respective adjacent valve means to vary the position of said valve.

5. In combination in a spring unit for vehicles having a chassis and a supporting member for supporting a wheel of said vehicle: a first bellows arranged above said supporting member and having its inner end connected thereto for receiving compressed air, a second bellows having a smaller volume than said first bellows and being arranged below said supporting member while having its inner end connected to said supporting member so as to prevent any substantial direct communication between the interior of said bellows, said first and second bellows being substantially axially aligned with each other, a hollow frame member designed as an auxiliary air container common to said first and second bellows and connected to said chassis, said first and second bellows having their outer ends connected to said frame member, valve means respectively associated with said first and second bellows and operable independently of each other to establish and interrupt communication between the respective bellows and said auxiliary container, means continuously urging said valve means into a certain position, and tubular rubber spring means respectively arranged within said first and second bellows and adapted in response to a certain position of the respective bellows pertaining thereto to actuate the respective adjacent valve means to vary the position of said valve.

References Cited in the file of this patent

UNITED STATES PATENTS

| | | |
|---|---|---|
| 2,115,072 | Hunt et al. | Apr. 26, 1938 |
| 2,443,433 | Sanmori | June 15, 1948 |
| 2,773,686 | Nash | Dec. 11, 1956 |